United States Patent [19]

Faykish et al.

[11] Patent Number: 5,080,463
[45] Date of Patent: Jan. 14, 1992

[54] RETROREFLECTIVE SECURITY LAMINATES WITH PROTECTIVE COVER SHEETS

[75] Inventors: Lynn E. Faykish, Minneapolis; Wallace K. Bingham, North St. Paul, both of Minn.

[73] Assignee: Minnesota Mining and Manufacturing Company, St. Paul, Minn.

[21] Appl. No.: 535,343

[22] Filed: Jun. 8, 1990

Related U.S. Application Data

[63] Continuation-in-part of Ser. No. 369,630, Jun. 21, 1989, abandoned.

[51] Int. Cl.⁵ .................... G02B 5/128; B32B 7/14
[52] U.S. Cl. .................... 359/536; 359/534; 428/204; 283/85
[58] Field of Search .................... 350/104–107, 350/109; 428/203–204, 206, 207, 215

[56] References Cited

U.S. PATENT DOCUMENTS

| | | | |
|---|---|---|---|
| 2,407,680 | 9/1946 | Palmquist et al. | 88/82 |
| 3,154,872 | 11/1964 | Nordgren | 40/135 |
| 3,188,265 | 6/1965 | Charbonneau et al. | 161/188 |
| 3,188,266 | 6/1965 | Charbonneau et al. | 161/188 |
| 3,551,025 | 12/1970 | Bingham et al. | 350/105 |
| 3,767,291 | 10/1973 | Johnson | 350/237 |
| 3,795,435 | 3/1974 | Schwab | 350/105 |
| 3,801,183 | 4/1974 | Sevelin et al. | 350/105 |
| 3,832,038 | 8/1974 | Johnson | 350/236 |
| 3,994,086 | 11/1976 | Mizuochi | 40/135 |
| 4,082,426 | 4/1978 | Brown | 350/105 |
| 4,099,838 | 7/1978 | Cook et al. | 350/105 |
| 4,663,213 | 5/1987 | Bailey et al. | 428/204 |
| 4,721,649 | 1/1988 | Belisle et al. | 428/325 |
| 4,808,471 | 2/1989 | Grunzinger | 428/325 |

FOREIGN PATENT DOCUMENTS 972442 10/1964 United Kingdom .

OTHER PUBLICATIONS

ASTM D-1474-85, pp. 175-178, Jun., 1985.
ASTM D-1044-85, Standard Test Method for Resistance of Transparent Plastics to Surface Abrasion.

Primary Examiner—Bruce Y. Arnold
Assistant Examiner—James Phan
Attorney, Agent, or Firm—Gary L. Griswold; Walter N. Kim; Robert H. Jordan

[57] ABSTRACT

A retroreflective security laminate, designed to be applied to the surface of a document over information thereon, and having a protective cover sheet comprising an abrasion-resistant outer layer and a support layer which is resistant to deformation under localized pressure. Also methods for making such laminates.

28 Claims, 2 Drawing Sheets

Fig. 6

RETROREFLECTIVE SECURITY LAMINATES WITH PROTECTIVE COVER SHEETS

CROSS-REFERENCE TO RELATED APPLICATION

This application is a continuation-in-part of U.S. application Ser. No. 369,630, filed Jun. 21, 1989, now abandoned.

FIELD OF THE INVENTION

The invention relates to retroreflective security films designed to be laminated to the surfaces of documents such as driver licenses and identification cards to provide means for authenticating the documents and means for enabling detection of alterations of the information contained therein.

BACKGROUND OF THE INVENTION

The retroreflective security films disclosed in U.S. Pat. No. 3,801,183 (Sevelin) provide many features making them well-suited for use as security overlays which can be laminated over a document or portions thereof. Such films are commonly used on such documents as identification cards, driver licenses, or documents of title, providing means for authenticating the documents as well as means for readily detecting tampering or attempted tampering therewith. Such security films are typically made with reflective layers which are substantially transparent in diffuse light conditions, thereby permitting the information on the document surface to be easily read. Commonly, the entire surface of the film has some level of retroreflection that is readily observable with a retroreflective viewing device such as disclosed in U.S. Pat. Nos. 3,767,291 (Johnson) and 3,832,038 (Johnson). Typically, any penetration of the film is disruptive to retroreflection by the film and is thus readily apparent under retroreflective viewing conditions, thereby providing means for enabling detection of tampering. Legends or patterns of enhanced retroreflection can be provided as desired in the form of logos, special messages, or other images to provide means for authentication.

U.S. Pat. No. 4,099,838 (Cook et al.) discloses a retroreflective sheet material which carries retroreflective legends provided by a dielectric mirror wherein the mirror is patterned so that the reflectivity from the mirror carries a pattern of contrasting colors. The patent discloses that security films of the type disclosed in U.S. Pat. 3,801,183 may be made with such patterned reflectivity.

Previously known security films have been provided both in "exposed-lens" (i.e., with the front surfaces of the microspheres protruding from the front surfaces of the film) and "embedded-lens" (i.e., with the front surfaces of the microspheres being embedded within the film) embodiments.

However, previously known security films may exhibit certain disadvantages, including limited resistance to abrasion, tendency to deform or for retroreflectivity to be disturbed when subjected to moderate pressures, limited durability under certain conditions of use such as are encountered by employee identification cards and driver licenses, and particularly in the case of exposed-lens constructions, tendency to accumulate dirt between microspheres and tendency for microspheres to dislodge when the sheeting is exposed to high humidity.

SUMMARY OF THE INVENTION

The present invention provides embedded-lens retroreflective security laminates which may be applied to documents, e.g., over visual information on the surfaces thereof, to provide means for authenticating the documents, means for deterring attempts to tamper with the documents and information thereon, and means for providing readily detectable indication of such tampering. Security laminates of the invention can provide many advantages over previously available security films, including higher resistance to abrasion, higher resistance to deformation under moderate pressures such as are typically encountered by ordinary handling and use, higher resistance to accumulation of dirt, and higher retention of microspheres when the laminate is flexed. Accordingly, security laminates of the invention can provide exceptional durability under varied conditions of use to which documents such as employee identification cards and driver licenses are typically subjected. Laminates of the invention can be made in flexible or rigid form as desired.

The structure of retroreflective security laminates of the invention is as follows. Similar to the films disclosed in the aforementioned U.S. Pat. No. 3,801,183, security laminates of the invention are legend-containing, substantially transparent laminates which are retroreflective over at least a portion of their surface area, having retroreflective legend areas and retroreflective background areas, which areas are substantially transparent and substantially indistinguishable under ordinary diffuse light viewing conditions. By "substantially transparent" it is meant that under diffuse light conditions the laminate appears to be essentially transparent and free of a legend or that, if detectable by the unaided eye, the legend is too faint to substantially obscure the visual information on the document over which the laminate has been applied. One of the areas, i.e., either the background area or the legend area, has a greater retroreflective efficiency than the other whereby the legend areas are readily discernible from the background areas under retroreflective light viewing conditions.

In brief summary, the security laminates of the invention differ from those known in the art in that they comprise:

a) a base sheet comprising microspheres arranged in substantially a monolayer with partially-light-transmissive reflectors disposed behind the rear surfaces thereof in optical association therewith to form the aforementioned legend and background areas, the microspheres being at least partially embedded in a transparent binder layer; and a cover sheet adhered to the front side of the base sheet, wherein the cover sheet comprises, as described herein, an outer layer and a support layer, and in some instances an optional bonding layer.

The cover sheet serves to provide high durability as mentioned above as well as providing a critical role in enabling retroreflection. Typically, the cover sheet is of multilayer construction, often permitting optimization of several different properties thereof. For instance, in some embodiments security laminates may be made which exhibit both high abrasion resistance and high resistance to damage from point pressure. In some preferred embodiments, laminates may be made which provide high resistance against tampering with heat.

The present invention also provides novel methods for making such security laminates.

The security laminates of the invention are particularly useful when applied to documents such as identification cards, passports, driver licenses, credit cards, stock certificates, deeds, automobile titles, etc. The laminates can be used to provide means for identifying or authenticating the document including the visual information displayed thereon and means for deterring or rendering more difficult tampering with the document or counterfeiting of same. Other advantages of the laminates of the invention include the difficulty of removing the laminate from the document without destroying the structural integrity of the laminate thereby providing readily detectable indication of tampering, and the difficulty of duplicating or reproducing the laminate and legend contained therein without relatively sophisticated and expensive equipment and know-how.

BRIEF DESCRIPTION OF DRAWING

The invention will be further explained with reference to the drawing, wherein like numbers refer to like elements and wherein.

These figures, which are idealized, are not to scale and are intended to be merely illustrative and nonlimiting. For instance, each circle represents a full circumference as though the microspheres were of uniform diameters and arranged in uniform rows. Furthermore, legends will normally be much wider than only a few microspheres as is schematically illustrated.

DETAILED DESCRIPTION OF PREFERRED EMBODIMENTS OF THE INVENTION

Figure 1:
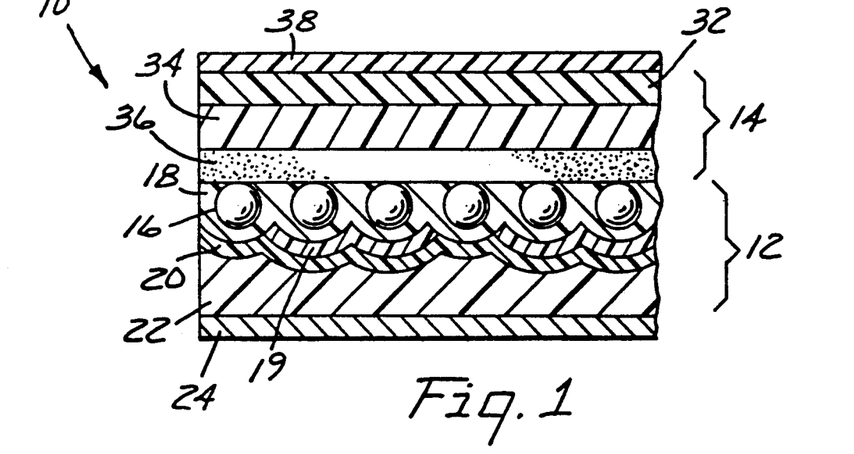
FIG. 1 is a cross-sectional illustration of a portion of one embodiment of a security laminate of the invention.

FIG. 1 illustrates a portion of one embodiment of security laminate 10 of the invention. As shown in the figure, laminate 10 comprises base sheet 12 and cover sheet 14. Base sheet 12 comprises microspheres 16 which are embedded in binder 18 with lacquer 19 in an imagewise pattern and reflector 20 disposed behind the rear surfaces thereof. As shown, binder 18 provides a spacing layer immediately behind the rear surface of microspheres 16. Typically laminate 10 further comprises attachment adhesive 22 on the back side thereof. Attachment adhesive 22 is typically covered by optional release liner 24.

The microspheres used herein are preferably substantially spherical in shape in order to provide the most uniform and efficient retroreflection. Furthermore, the microspheres are typically preferably substantially transparent so as to minimize the amount of light absorbed by the microspheres and thereby optimize the amount of light which is retroreflected by laminates of the invention. Furthermore, the microspheres are typically preferably substantially colorless; although, in some instances, the microspheres may be colored to produce special effects if desired. Microspheres used herein may be made from glass or synthetic resin having the optical properties and physical characteristics taught herein. Glass microspheres are typically preferred because they typically cost less than microspheres made of synthetic resins.

Microspheres used in security laminates of the present invention will typically have an average diameter of between about 40 and about 200 microns. Microspheres which are smaller than this range may tend to provide lower levels of retroreflection because of diffraction effects, whereas microspheres larger than this range may tend to impart undesirably high thickness to resultant laminates or make laminates incorporating the same more susceptible to cracking when flexed. The refractive index of microspheres used in laminates of the present invention is typically between about 2.00 and about 2.60. It will be understood, however, that microspheres having refractive indices outside this range may be used in accordance with the present invention. As will be understood, the optimum index of refraction for microspheres in a laminate of the invention will depend in part upon the overall construction of the security laminate, i.e., whether the binder provides a spacing layer behind microspheres, the thickness of such spacing layer, etc.

Figure 2:
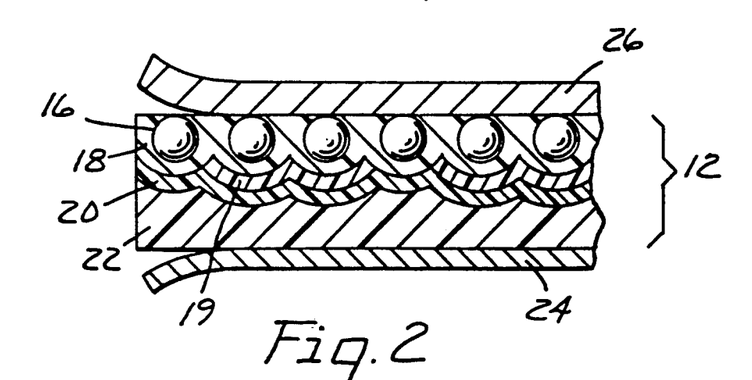
FIG. 2 is a cross-sectional illustration of a portion of one embodiment of a base sheet of a retroreflective security film of the invention.

One method for forming a laminate of the invention is explained with reference to FIG. 2 wherein is shown base sheet 12 which comprises microspheres 16 embedded in binder 18 with lacquer 19 and reflector 20 therebehind. The first step is typically to apply a mixture or slurry of selected microspheres 16 in binder material or composition 18 to carrier 26. Carrier 26 is selected so as to release from binder layer 18 and microspheres 16, after formation of binder layer 18. Carrier 26 should also provide sufficient strength as well as sufficient stability when exposed to heat and chemicals to permit formation of the base sheet as described herein. Preferably, the surface of carrier 26 on which the base sheet is formed has a very smooth, e.g., glossy, finish. Illustrative examples of materials useful as carrier 26 include polyethylene terephthalate films and certain polymer-coated papers having the properties described herein.

Figure 6:
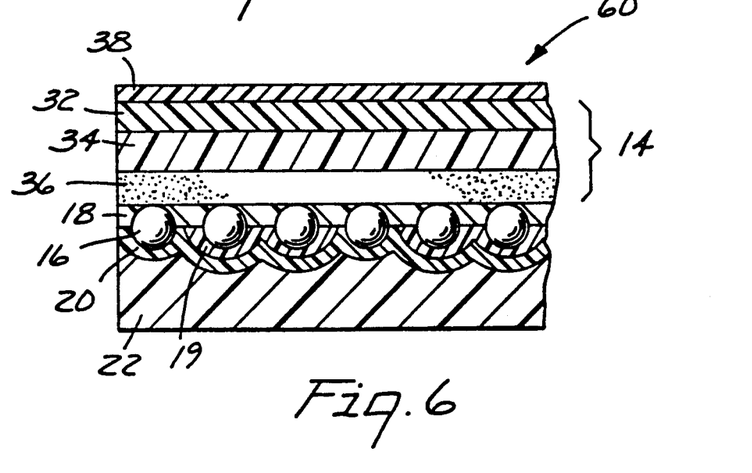
FIG. 6 is a cross-sectional illustration of a portion of another embodiment of a security laminate of the invention.

After application of the slurry to carrier 26, microspheres 16 will typically settle to the surface of carrier 26 to become substantially arranged in a monolayer thereon with the microspheres typically being in substantially only tangential contact therewith. In some embodiments, binder material 18 preferably tends to conform to the rear surfaces of microspheres 16 so as to result in a layer having substantially uniform thickness thereon. The relative amounts of binder material and microspheres that should be used will be based in part upon the size of the microspheres and the nature of the moderate temperatures and environments, e.g., upon exposure to high humidity, and have a suitable refractive index which will enable the laminate to provide desired binder material used. Typically, an amount of binder material that provides a layer, referred to herein as a spacing layer, on the rear surfaces of microspheres 16 that is about as thick as the focal length of microspheres 16 will be useful in such embodiments. It will be understood by those skilled in the art that the reflector is preferably located at approximately the focus point of the microspheres, i.e., is located behind the microspheres at a distance equivalent to the focal length thereof. As will be further understood, the focal length of microspheres in such constructions is dependent in part upon the index of refraction of the microspheres and the index of refraction of the binder layer in which the front surfaces of the microspheres are embedded. In constructions wherein the ratio of the index of refraction of the microspheres is about 1.9 times that of the binder layer, the reflector is preferably located directly on the back surfaces of the microspheres (as shown in FIG. 6) whereas if the ratio is somewhat lower, the reflector is preferably located at a position somewhat removed from the rear surfaces of the microspheres (as shown in FIG. 1).

The microspheres are typically preferably substantially uniform in size so that the resultant laminate will exhibit substantially more uniform retroreflective properties and in order to facilitate fabrication of the laminate. The binder material or composition is selected in part to provide a composition which will form, e.g., upon drying or curing, a binder layer which will adhere to microspheres 16, and to later applied lacquer 19, reflector 20, and the cover sheet. In addition, resultant binder layer 18 will preferably be flexible, dimensionally stable such that the laminate will maintain its structural integrity when exposed to moderate temperatures and environments, e.g., upon exposure to high humidity, and have a suitable refractive index which will enable the laminate to provide desired retroreflection. Illustrative examples of binder materials which are useful in embodiments of the invention include polyvinyl butyral and polyester resins. Typically the binder layer will have a refractive index of between about 1.4 and about 1.6.

In one illustrative embodiment, microspheres 16 which are substantially spherical and have an index of refraction of about 2.25 and an average diameter of about 60 micrometers will be useful with a binder material that comprises polyvinyl butyral and provides a spacing layer having a thickness of about 12 microns and a refractive index of between about 1.4 and about 1.5.

The pattern of differential retroreflective properties is provided by applying, in imagewise fashion, lacquer 19 to the back side of the spacing layer provided by binder layer 18. The term "lacquer" is used herein to refer to any material, typically substantially transparent, which may be applied as discussed herein in discontinuous or imagewise fashion to delineate the legend areas and is not meant to refer to a particular class of resins. Lacquer 19 may be applied by any of several different well-known techniques, including but not limited to rotogravure or flexographic printing. Lacquer 19 may be applied in any desired image, e.g., in the form of one or more logos or alphanumeric characters. The legend may contain a special message or instructions, or may simply be a pattern of a single or repeating characters. If desired, two or more different lacquers which provide somewhat different resultant retroreflective performance may be used in a single security laminate of the invention to provide special effects.

An illustrative example of a suitable lacquer is FLEXO ROTO Lacquer No. FA 14929 which is commercially available from Consolidated Printing Inks Company. Typically, it is preferred that lacquers used herein have a viscosity corresponding to a rating of between about 30 and about 60 seconds in a No. 2 Zahn cup, as such lacquers typically provide an optimum combination of handling characteristics and flow properties to enable formation of high resolution images or legends with reasonable cost and degree of difficulty. It will be understood, however, that lacquers having viscosities outside this range may be used in accordance with the present invention.

After imagewise application, and typically drying or curing, of lacquer 19, dielectric reflector 20 is formed over lacquer 19 and the exposed portions of the spacing layer in accordance with the teachings of the aforementioned U.S. Pat. No. 3,801,183 which is incorporated herein by reference.

A preferred material for use in dielectric mirror 20 is zinc sulfide (ZnS), which can be applied by any of several well-known vapor coating techniques. As is understood by those skilled in the art, the retroreflective efficiency, i.e., the fraction of incident light reflected back toward its source, depends in part on the efficiency of reflection of dielectric mirror 20 as well as the degree to which incident light is focused on dielectric mirror 20 by microspheres 16. One method for increasing the retroreflective efficiency of reflector 20 is to form a dielectric mirror comprising two or more layers of alternating high and low refractive index as is discussed in U.S. Pat. No. 3,801,183. For instance, a layer of zinc sulfide may be applied to the back of binder layer 18 and lacquer 19, and then a layer of a material having a relatively lower refractive index, e.g., cryolite ($Na_3AlF_6$) may be applied to the exposed surface of the first formed zinc sulfide and then in turn another layer of zinc sulfide applied to the back of the layer of cryolite. If desired, successive pairs of cryolite or similar material and zinc sulfide or similar material may be applied. Thus reflector 20 may be single layer in some embodiments and may be multi-layer in other embodiments.

It is disclosed in U.S. Pat. No. 4,099,838 (Cook), which is incorporated herein by reference, that the thickness of the elements of a dielectric layer may be controlled or "tuned" to preferentially reflect different segments of the color spectrum, i.e., to reflect in a desired color range. In this way, the retroreflective performances of the legend and background areas can be controlled so as to provide desired effects such as enhanced legibility by providing for contrasting colors and/or retroreflective efficiency between the legend and background areas. For instance, a yellow legend and purple-blue background can be provided. In some embodiments, the legend may be distinctly brighter than the background under retroreflective viewing conditions.

To achieve the brightest or most intense retroreflective brightness of white light, the optical thicknesses of the individual elements of the dielectric reflector preferably correspond to an odd-numbered multiple of one-quarter of one wavelength of light in the desired wavelength range, e.g., typically about 5000 to about 6000 angstroms.

U.S. Pat. No. 4,099,838 also discloses a property defined therein as a "sticking coefficient" (see column 3, lines 25-49) which relates to the tendency of vapor coated materials, e.g., zinc sulfide, to be deposited more quickly on some surfaces than on others. For example, in some instances the zinc sulfide may be deposited upon the exposed portions of the binder layer more quickly than it does on the lacquer. This phenomenon may thus result in a dielectric reflector layer having different optical thickness at different points so as to have different retroreflective properties at those points.

Following completion of reflector 20, base sheet 12 is typically completed by application of attachment adhesive 22 over reflector 20. In many applications, attachment adhesive 22 is used to adhere the resultant security laminate to the face of a document, typically over a portion of the document on which information is displayed. Accordingly, attachment adhesive 22 is selected to provide adhesion to the desired substrate and is preferably substantially transparent. If desired, attachment adhesive 22 can be a hot melt adhesive formulation such that the resultant laminate is applied to a document by heat lamination. In some embodiments, attachment adhesive 22 may be pressure-sensitive in nature. Typically, attachment adhesive 22 is preferably substantially colorless, although if desired it may be colored to achieve special effects. Typically, attachment adhesive 22 is preferably quite stable such that it does not change color or substantially weaken in bonding strength as it ages. Preferably, attachment adhesive 22 is selected to provide bond to reflector 20 and to the ultimate substrate (not shown) which is stronger than the interlayer adhesion of the other elements of security laminate 10 and/or the substrate such that attempts to remove the laminate 10 from the document in order to tamper with the document will result in readily visible damage to the laminate or document. Illustrative examples of materials useful as attachment adhesives herein include high molecular weight thermoplastics, e.g., ethylene/acrylic acid copolymers, such as PRIMACOR 1410 and DAF 808 which are commercially available from Dow Chemical Company. Typically, attachment adhesive 22 will be a substantially continuous layer which is between about 40 and about 80 microns in thickness.

In some instances, attachment adhesive 22 will comprise a layer made up of segments of more than one kind of adhesive. For instance, the layer may be made up of a pattern of segments of a first kind of adhesive which preferentially adheres to reflector 20 and a second kind of adhesive which adheres less strongly to reflector 20 such that it preferentially releases from reflector 20 and thus preferentially adheres to the ultimate document to which the laminate is applied such that, after application to the document and upon application of a peel force, attachment adhesive 22 will separate in the aforementioned pattern to provide an indication of attempted removal.

Typically, attachment adhesive 22 will be covered with temporary release liner 24 prior to application of the laminate to a substrate. In many instances, it will be desired to impart a matte finish to the bottom surface (i.e., the surface which is bonded to the substrate) of attachment adhesive 22 as a matte finish typically improves the tendency of the adhesive to wet the surface of the document to which the resultant laminate is being applied. In some instances, if the bottom of attachment adhesive 22 has a highly glossy finish, air bubbles may tend to become entrapped, thereby impairing the bond which is achieved.

Referring again to FIG. 1, cover sheet 14 is typically multlayer in construction. For instance, cover sheet 14 may comprise outer layer 32, support layer 34, and optional bonding layer 36.

Outer layer 32 is typically selected to exhibit high resistance to conditions to which the resultant laminate is likely to be subjected, such as abrasion, exposure to deleterious agents, etc. Thus, outer layer 32 comprises a durable, tough material. Depending in part upon the application for which the security laminate is being prepared, films of many different polymers and copolymers could be used in outer layer 32. Illustrative examples of preferred abrasion-resistant materials for use in outer layer 32 include high molecular weight thermoplastic copolymers which are inherently tough, of which ionomeric ethylene methacrylic acid copolymers such as SURLYN 9910 which is commercially available from Du Pont are preferred examples. Other useful examples include ethylene acrylic acid copolymers such as PRIMACOR 1420 which is commercially available from Dow Chemical Company. In a typical embodiment, outer layer 32 is between about 0.5 and about 1.5 mils (10 and 40 microns) thick.

By "abrasion-resistant" it is meant that the outer layer is resistant to damage such as a substantial reduction in optical clarity or transparency when subjected to abrasive forces such as encountered by a card being inserted into a wallet. Abrasion resistant outer layers also improve the resistance of the laminate incorporating same to accumulation of dirt by tending to retain a smooth surface rather than easily developing gouges and roughened portions which might readily collect dirt. As used herein, the term "abrasion-resistant" materials means to materials which, after 100 abrasion cycles in accordance with ASTM D-1044-85, which is incorporated herein by reference, suffer an increase in percent haze of less than about 20 percent and preferably less than about 10 percent. For instance, films of the aforementioned SURLYN 9910 have been observed to suffer an increase in percent haze of only about 8 percent after this test. In comparison, certain conventional polyester films have been observed to suffer increases in percent haze of over 40 percent.

Support layer 34 is selected to impart other desired properties to cover sheet 14 and the overall laminate into which it is to be incorporated. For instance, in a preferred embodiment, structural layer 34 is selected to impart improved resistance to deformation under localized pressure, such as might be encountered by pressing with a pen on a security laminate which is mounted on a document. Another common source of pressure is when a document bearing a laminate of the invention is located next to the face of an embossed credit card in a wallet which is being carried in the hip pocket of a person. When the person sits, the wallet and its contents are typically subjected to compressive forces such that the portions of the document abutting the embossed characters of the credit card may be subjected to substantial point pressures. Such pressures may tend to damage the laminate or cause it to degrade or wear, thereby shortening the effective life of the anti-tampering properties thereof or even damaging the laminate so severely that the document becomes unreadable under diffuse lighting conditions.

The support layer should resist deformation under probable point pressures to which the security laminate is expected to be subjected to during use and to which the laminate is intended to withstand. For instance, as mentioned above, a laminate may be written on or it may be pressed against nonplanar objects while subjected to substantial pressures. Thus, the support layer should provide sufficient tensile strength such that the laminate will resist deformation under such pressures, thereby protecting the other elements of the laminate, particularly the critical arrangement of microspheres and reflector from unwanted changes in arrangement. It is believed that film materials that are at least about 1 mil (25 microns) thick and have a Young's Modulus of between about 2000 and about 6000 MegaPascals (MPa), preferably between about 3500 and about 5500 MPa, will exhibit the desired properties to function as a support layer herein. Accordingly, materials having Young's Moduluses in those ranges are referred to herein as "resistant to deformation under localized pressure". "Young's Modulus" or modulus of elasticity is defined in the Encyclopedia of Polymer Science & Enginering, 2nd ed., vol. 7, pp. 82–85, as "a measure of the force that is required to deform the film to a certain degree" and is also "a measure of the intrinsic stiffness of the film".

Alternatively, the "resistance to deformation under localized pressure" of a material is indicated by its Knoop Hardness as determined in accordance with ASTM D-1474-85, which is incorporated herein by reference. Film materials that are at least about 1 mil (25 microns) thick and have a Knoop Hardness of at least about 10, and preferably at least about 20, are considered to be herein "resistant to deformation under localized pressure". For instance, support layers in cover sheets of the invention can be made using polyester films having Knoop Hardnesses of at least 15 and in some instances at least 20.

An illustrative example of a preferred structural layer is film of polyethylene terephthalate, i.e., polyester, typically between about 1 and about 2 mils (25 and 50 microns) thick. Other illustrative examples include cellulose acetate, polystyrene, polycarbonate, and polyvinyl chloride films. Such materials provide increased tensile strength and resistance to distortion under localized pressure.

Bonding layer 36 comprises a layer which will provide a strong bond to the adjacent element of cover sheet 14, e.g., support layer 34, and base sheet 12. In many embodiments, bonding layer 36 may comprise a layer of adhesive. A preferred adhesive is a layer, between about 0.5 and about 2 mils (15 and 50 microns) thick, of high-melt-index, e.g., between about 10 and 50, thermoplastic film such as PRIMACOR 3440 or 3460 or ethylene/vinyl acetate copolymers such as ELVAX 250 from Du Pont. Such adhesives can be used to join a previously assembled base sheet and cover sheet to yield a security laminate of the invention. Typically, cover sheet 14 and base sheet 12 will be joined together by heat lamination to yield the resultant security laminate.

In some embodiments (not shown), a single layer having suitable properties may be used in place of separate support and bonding layers.

Also shown in FIG. 1 is optional lamination liner 38 on the outer surface of outer layer 32 of cover sheet 14. In some embodiments of the invention, lamination liner 38 is used as a surface on which to join cover sheet 14 to base sheet 12, typically facilitating handling of cover sheet 14 and providing protection thereto. An illustrative example of lamination liner 38 is a film of polyethylene terephthalate. Typically, liner 38 is about 20 and about 80 microns thick although it will be understood that carriers having thicknesses outside this range may be used if desired.

The inside surface of lamination liner 38, i.e., the surface on which cover sheet 14 is carried, preferably has a very smooth, i.e., glossy, finish. As mentioned above, laminates of the invention may be applied to documents by methods employing heat to activate attachment adhesive 22. Under such conditions, the outer surface of outer layer 32 may tend to soften so as to assume surface features of lamination liner 38. Accordingly, lamination liner 38 is preferably very smooth so as to yield a glossy outer surface on outer layer 32 which is desired for optimum retroreflection by minimizing the diffuse reflection which is associated with surfaces having matte finishes. In addition, lamination liner 38 should be "temperature resistant", i.e., it should not change so as to lose the desired release properties with respect to cover sheet 14 or become dimensionally unstable, e.g., tending to shrink or or stretch so as to spoil laminate 10, when heated to activate a heat-activated attachment adhesive 22. As used herein, "temperature resistant" materials are materials which are sufficiently dimensionally stable that when to between about 200° F. and about 350° F. (90° C. and 175° C.) they shrink or expand only about 3 percent or less.

In a preferred method of forming a security laminate of the invention, the cover sheet film is a multilayer construction fabricated by extruding thermoplastic outer layer 32 and bonding layer 36 to opposite sides of support layer 34. Strong interfacial adhesion between the various layers can be provided by priming the layers, e.g., by corona or plasma treatment, or utilizing a process for enhancing the adhesion therebetween, such as is disclosed in U.S. Pat. Nos. 3,188,265 (Charbonneau) and 3,188,266 (Charbonneau). Alternatively, outer layer 32 and bonding layer 36 may be extruded onto support layer 34 after treating of the latter on one or both sides with adhesion promoting primer(s). As will be understood, the particular means useful for providing the desired interfacial adhesion will depend in part upon the particular materials used in the subject layers and may be readily determined by trial and error.

Figure 3:
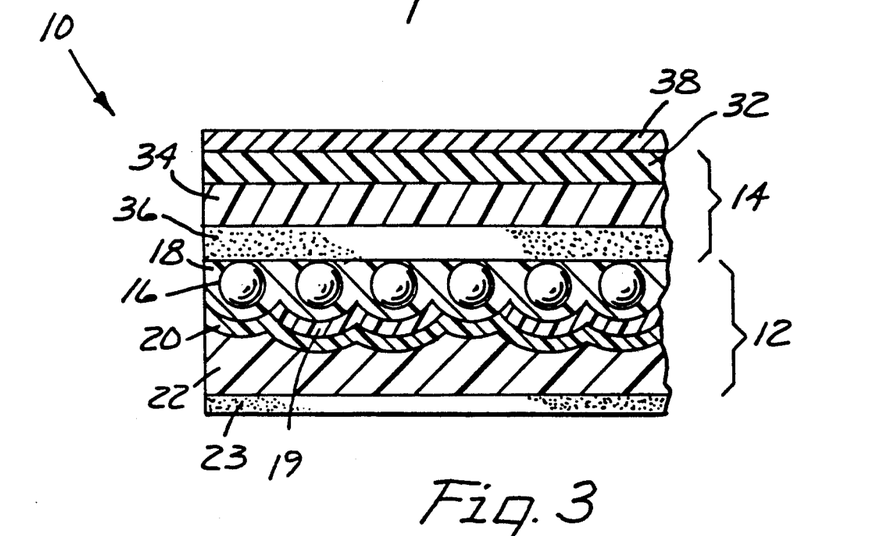
FIG. 3 is a cross-sectional illustration of a portion of another embodiment of a security laminate of the invention.

In some embodiments, attachment adhesive 22 may be selected so as to provide a compatible bond or adhesion to special surfaces. Alternatively, as shown in FIG. 3, an additional layer 23 of special adhesive or other material can be applied to provide means for compatibly bonding with documents having special surface characteristics, e.g., photographic emulsions or images prepared by thermal dye transfer techniques. By "compatibly bond" it is meant to bond without undesired degradation of the substrate, e.g., fading or smearing of the information such as by the break down of an imaged photographic emulsion due to agents in the attachment adhesive, but with high adhesion such that the laminate cannot be removed by peeling without visibly damaging the substrate so as to provide readily apparent indication of tampering. In an illustrative embodiment, Polaroid Corporation's Adhesive Solution No. 2 is rotogravure coated onto attachment adhesive 22 to provide compatibility with Polaroid's wet photographic films. In another illustrative embodiment, a layer of VITEL 222 polyester resin from Goodyear is solution coated onto attachment adhesive layer 22 to provide compatibility with thermally imaged dye receptive surfaces, which comprise selectively deposited dyes transferred by thermal dye transfer to a dye-receptor treated substrate.

The term "secured document" is used herein to describe any document to which a security laminate of the invention is applied. The term "document" will be understood to include "inserts" designed to be laminated into a pre-assembled identification card pouch, where a security laminate of the invention is over-extensive to, i.e., extends beyond the extent of, the information surface of a document such as the photograph in an identification card, to include identification cards where the security laminate is substantially flush with the edges of the document, and also to include package labels, etc., where the area protected by the security laminate is of lesser extent than the entire object.

Figure 4:
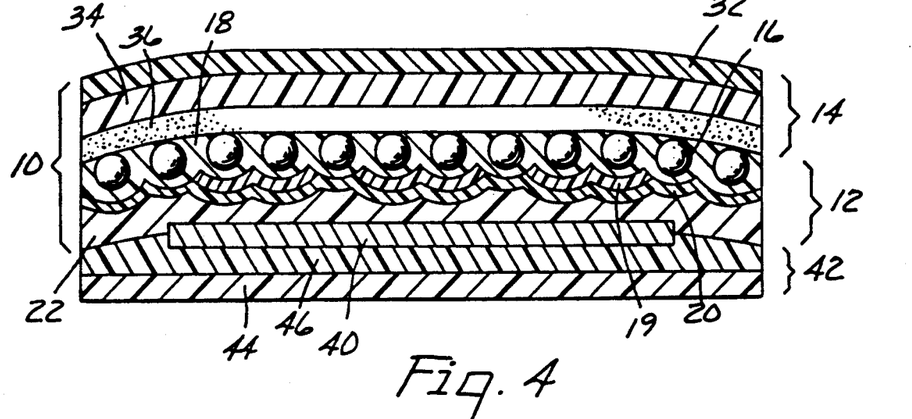
FIG. 4 is a cross-sectional illustration of a portion of a secured document of the invention comprising a security laminate and a backing member as disclosed herein.

FIG. 4 illustrates a secured document of the invention which comprises retroreflective security laminate 10, enclosed document 40, and backing member 42. Security laminate 10 may optionally comprise an additional special adhesive layer (not shown), as discussed above. Document 40 may comprise paper, coated paper, plastic film, photographic film, thermally-imaged substrates, and other identification card substrate materials, and may contain printed or photographic alphanumeric characters or artwork on its front and back surfaces. During the heat-lamination process (not shown), typically performed in a small roll laminator, backing member 42 bonds to the edges of security laminate 10 thus surrounding and enclosing document 40, and preferably bonds to the document 40 as well. An illustrative backing member is a 1 to 2 mil (25 to 50 microns) thick layer of a high melt index adhesive 46 such Du Pont ELVAX 550 bonded to a 2 to 5 mil (50 to 125 microns) thick sheet 44 of polyester. Preferably attachment adhesive 22 is selected to have a relatively low melt index, e.g., about 1.5, and bonding layer 36 is selected to have a high melt index, e.g., about 10 to about 50, to further frustrate attempts to tamper with the protected document. In such instances, application of heat to soften attachment adhesive 22 as a means to separate security laminate 10 from the document will first soften bonding layer 36, thereby loosening cover sheet 14 from fragile base sheet 12. Any damage to base sheet 12 is readily apparent under retroreflective viewing conditions, thereby enabling easy detection of tampering.

Figure 5:
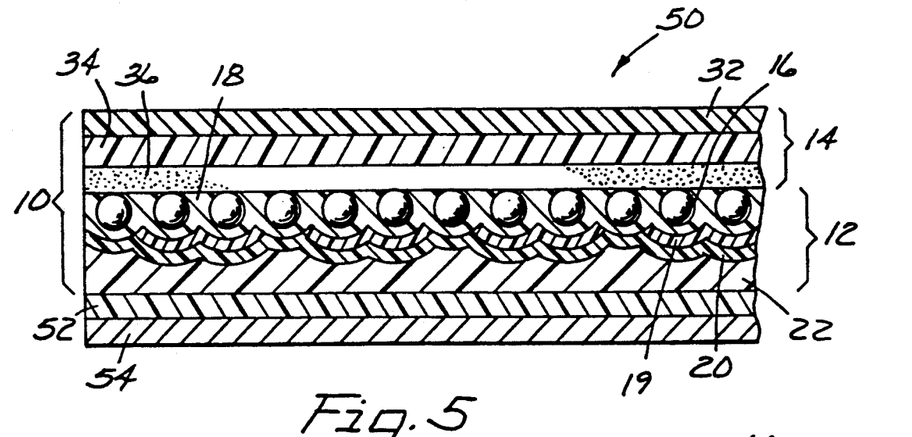
FIG. 5 is a cross-sectional illustration of a portion of another embodiment of a secured document of the invention.

FIG. 5 illustrates another secured document of the invention. Therein is illustrated secured document 50 comprising security laminate 10 applied to photographic emulsion 52 on photographic paper 54. In some instances, for use on such documents, security laminate 10 may further optionally comprise an additional specialized adhesive layer (not shown) as discussed above.

In some instances, increased retroreflective efficiency can be obtained in constructions wherein the reflector is in direct contact with the rear surfaces of the microspheres. U.S. Pat. No. 3,551,025 (Bingham) discloses an enclosed-lens retroreflective sheeting wherein the refractive indices of the microspheres and binder material are such that the reflector layer is in direct contact with the rear surfaces of the microspheres. FIG. 6 illustrates an embodiment of security laminate 60 of the invention, wherein dielectric reflector 20 is in direct contact with microspheres 16 except where spaling results from the presence of order for incident light to focus at the rear surfaces of microspheres 16, and accordingly on reflector 20, microspheres 16 must have indices of refraction of about 1.9 times that of the binder material in which the monolayer of microspheres is embedded. For instance, microspheres having an index of refraction of about 2.58 could be used in a binder material having an index of refraction of about 1.38. Many organic resins having refractive indices in this range will be known to those skilled in the art.

Laminate 60 illustrated in FIG. 6 can be made by coating binder material 18, e.g., a fluorinated resin such as Du Pont VITON A, having an index of refraction of about 1.38, directly onto cover sheet 14 and then cascading microspheres 16 having a refractive index of about 2.58 thereinto such that they are partially, preferably substantially hemispherically, embedded therein. Lacquer 19 is then selectively printed directly on the exposed rear surfaces of microspheres 16, and then dielectric reflector 20, e.g, a vapor coated layer of zinc sulfide, applied thereto. Attachment adhesive 22 can then be applied thereto.

EXAMPLES

The invention will be further explained by the following illustrative examples which are intended to be nonlimiting. Unless otherwise indicated, all amounts are expressed in parts by weight.

Unless otherwise indicated, the following test procedures were used to evaluate the security laminates prepared in Examples 1-7.

Abrasion Resistance

After a secured document with the subject laminate applied thereto was prepared, the front or outer surface of the cover sheet of the laminate was rubbed for 50 one-direction strokes with #600 wet or dry sandpaper using normal finger pressure of about 6 to about 10 ounces. The laminate was then examined for evidence of penetration of the cover sheet, loss or degradation of legibiltiy of underlaying information under diffuse light conditions, and loss or degradation of retroreflective appearance under retroreflective viewing conditions.

Point Pressure Resistance

A secured document with the subject laminate applied thereto was prepared. The document was placed on a flat surface with the cover sheet of the laminate facing upward. Three 3/16 inch width hexagonal nuts were placed separately on the cover sheet and a 5 pound weight placed thereon such that it was jointly supported by the three nuts. The assembly was then exposed to room temperature, then 120° F. (50° C.), and then 150° F. (65° C.), each for a period of 24 hours. After each 24 hour period, the laminate was examined for visible indentation to the cover sheet, dislocation of the microspheres within the laminate, and loss or degradation of the retroreflective appearance of the laminate under retroreflective viewing conditions.

EXAMPLE 1

A base sheet was formed by notch bar coating a slurry of microspheres in binder composition to a temporary release liner. The binder comprised the following:

| Amount | Component |
| --- | --- |
| 2.8 | Water |
| 29.0 | Xylol |
| 15.0 | BUTVAR B-90 - (polyvinyl butyral resin from Monasanto) |
| 43.7 | N-butanol |
| 6.0 | UFORMITE F240 - (urea formaldehyde from Reichhold Chemicals) |
| 3.5 | AROPLAZ 1351 - (alkyl resin from Spencer Kellogg) |

The microspheres were glass microspheres having an average diameter of about 60 microns and an index of refraction of about 2.25. The slurry was made with a binder to microspheres weight ratio of about 1.86:1. The microspheres settled to the carrier, substantially assuming a monolayer arrangement, and then the binder composition was cured by air drying for about 10 minutes, and then heating in an oven at about 150° F. (65° C.) for about 5 minutes and then in an oven at about 260° F. (125° C.) for about 7 minutes to form a binder layer having a spacing layer of about 12 microns thick behind the rear surfaces of the microspheres.

A lacquer of FLEXOTUF Varnish, a polyamide ink from Inmont, diluted with ethanol to a viscosity corresponding to a rating of about 30 seconds in a #2 Zahn cup was rotogravure printed in imagewise fashion using a plate press onto the spacing layer and the construction heated in an oven at about 150° F. (65° C.) for about 2 minutes to dry the printed lacquer.

A reflector was then formed by vapor coating a zinc sulfide layer of about one-quarter of one wavelength thickness on the exposed spacing layer and lacquer in a bell jar vacuum chamber according to standard techniques.

SCOTCH Brand PSA #966, an acrylic pressure-sensitive adhesive from 3M on a release liner, was cold roll laminated over the reflector to form the attachment adhesive in a layer about 2 mils (50 microns) in thickness.

A cover sheet was then formed by bonding together, in accordance with U.S. Pat. Nos. 3,188,265 and 3,188,266, an outer layer of a 1 mil (25 microns) thick film of SURLYN 9910 from Du Pont, a support layer of 1.5 mils (40 microns) thick film of polyester, and a bonding layer of a 1 mil (25 microns) thick film of PRIMA-COR 1420 from Dow Chemical.

The temporary carrier was then removed from the base sheet and the base sheet and the cover sheet then heat laminated together at an interface temperature of about 300° F. (150° C.) with a lamination liner (50 micron thick polyester film) contacting the outer surface of the outer layer of the cover sheet.

The release liner was removed from the attachment adhesive and the security laminate then cold roll laminated to a gelatin-based photograph. The lamination liner was then stripped from the cover sheet.

Under diffuse lighting conditions the laminate was substantially transparent. Under retroreflective viewing conditions, the background region appeared yellow while the legend (the lacquer areas) provided substantially no retroreflection. It is believed that little if any of the zinc sulfide vapor coat clung to the lacquer resulting in nonformation of the reflector therebehind.

The outer layer was found to be resistant to abrasion in that the cover film was not penetrated, legibility of underlying information in diffuse light was excellent, and retroreflective appearance was substantially unaffected. When evaluated in accordance with ASTM D-1044-85, SURLYN 9910 outer layers have been found to exhibit an increase in percent haze of only about 8 percent. The laminate was also found to be point pressure resistant after each of the testing conditions. After the conditioning at 150° F. (65° C.), the retroreflective appearance was detected but the retroreflective image was substantially not degraded. When evaluated in accordance with ASTM D-1474-85, the polyester support layer was found to have a Knoop Hardness of about 20.

EXAMPLE 2

A security laminate was made substantially as in Example 1 except as follows. The lacquer was FLEXOROTO Lacquer, an aliphatic hydrocarbon diluted in ethanol as in Example 1 from Consolidated Printing Ink Company, and was flexographically printed in imagewise fashion using a Webtron press and dried to specifications. The zinc sulfide was vapor coated to a thickness of about one-half of one wavelength. The attachment adhesive was a 1 mil (25 microns) thick film of DAF 808 from Dow Chemical Company which was hot laminated to the reflector. The lamination liner was a 0.5 mil (15 microns) thick film of polyester.

When the laminate was completed, it was heat laminated to a gelatin-based photograph. The lamination liner was then stripped from the cover sheet.

Under diffuse lighting conditions the laminate was substantially transparent. Under retroreflective viewing conditions, the legend areas appeared yellow while the background area appeared purple. In view of the contrast in color between the legend and the background, the legend was quite legible.

Heat was applied to the laminate, and removal of the laminate was attempted to evaluate that aspect of the tamper-resistance thereof. It was observed that the attachment adhesive tended to soften at substantially the same temperature as did the bonding layer, resulting in limited damage to the laminate upon removal from the photograph. This illustrates the utility of providing a bonding layer and attachment adhesive combination wherein the bonding layer will fail at a temperature substantially below that at which the attachment adhesive does.

Similar abrasion resistance and point pressure resistance results were observed as in Example 1.

EXAMPLE 3

A security laminate was made as in Example 2 except for the following. The zinc sulfide was applied to a thickness of about five-eighths of one wavelength. POLAROID ADHESIVE Solution No. 2 was rotogravure coated over the exposed surface of the attachment adhesive.

The laminate was heat laminated to a wet Polaroid photograph insert on a backing member of comprising a 2 mil (50 microns) thick sheet of ELVAX 550 from DuPont bonded to a 5 mil (125 microns) thick sheet of polyester. The lamination liner was then stripped from the cover sheet.

Under diffuse lighting conditions the laminate was substantially transparent. Under retroreflective viewing conditions, the legend areas appeared yellow while the background area appeared blue. In view of the contrast in color between the legend and the background, the legend was quite legible.

Attempts to peel the laminate from the photograph resulted in readily visible severe damage to the photograph. Thus, the laminate was considered to provide a highly secure seal.

Similar abrasion resistance and point pressure resistance results were observed as in Example 1.

EXAMPLE 4

A security laminate was prepared as in Example 2, and heat laminated to a gelatin-based photograph on a backing member similar to that used in Example 3 except that it further comprised a stiff paper backing. The lamination liner was then stripped from the cover sheet.

The security laminate had the same appearance under both diffuse and retroreflective viewing conditions as it did in Example 2. Attempts to peel the laminate from the photograph/paper substrate resulted in readily visible damage to the photograph and paper. Thus, the laminate was considered to provide a highly secure seal.

Similar abrasion resistance and point pressure resistance results were observed as in Example 1.

EXAMPLE 5

A security laminate was made as in Example 2 except for the following. The bonding layer comprised a 2 mil (50 microns) thick film of ELVAX 250 from Du Pont, the support layer comprised a 2 mil (50 microns) thick polyester film, and the zinc sulfide was vapor coated to a thickness of about five-eighths of one wavelength.

The laminate was heat laminated to a gelatin-based photograph. The lamination liner was then stripped from the cover sheet.

Under diffuse lighting conditions the laminate was substantially transparent. Under retroreflective viewing conditions, the legend areas appeared yellow while the background area appeared blue/green. In view of the contrast in color between the legend and the background, the legend was quite legible.

When heat was applied to the laminate and removal of same was attempted, the bonding layer softened before the attachment adhesive such that the laminate suffered readily visible damage. The laminate was thus considered to provide a highly secure seal.

Similar results for abrasion resistance were observed as in Example 1. During testing for point pressure resistance, no marring was observed under any of the conditions.

EXAMPLE 6

A security laminate was formed as in Example 2 except the bonding layer was a 1 mil (25 microns) thick film of PRIMACOR 3460, the lacquer was rotogravure printed, the zinc sulfide was applied to about one-half wavelength thickness, the attachment adhesive was a 1 mil (25 microns) thick layer of PRIMACOR 1410 applied on a polyester release liner, and the lamination liner was a 1 mil (25 microns) thick polyester film.

After removal of the polyester release liner from the attachment adhesive, the laminate was heat laminated to a gelatin-based photograph. The lamination liner was then stripped from the cover sheet.

Under diffuse lighting conditions the laminate was substantially transparent. Under retroreflective viewing conditions, the legend areas appeared faintly orange while the background area appeared purple thereby providing poor color contrast and poor legibility of the retroreflective image. The poor color contrast is believed to have resulted because of insufficiently thick lacquer deposit.

During attempted heat tampering, the bonding layer softened before the attachment adhesive resulting in readily visible damage to the laminate. It was thus considered to provide a highly secure seal.

Similar abrasion resistance and point pressure resistance results were observed as in Example 1.

EXAMPLE 7

A security laminate was made as in Example 6 except as follows. The lamination liner, a 1 mil (25 microns) thick polyester film, was laminated to the outer surface of the outer layer of the cover sheet, and then the slurry of binder material and microspheres was applied directly to the bonding layer of the cover sheet. The lacquer was a flexigraphically printed isooctyl acrylate/acrylic acid adhesive composition (63/35 weight ratio) diluted in ethanol to a viscosity corresponding to a rating of about 30 seconds in a #2 Zahn cup.

After removal of the polyester release liner from the attachment adhesive, the laminate was heat laminated to a gelatin-based photograph. The lamination liner was then stripped from the cover sheet.

Under diffuse lighting conditions the laminate was substantially transparent. Under retroreflective viewing conditions, the legend areas appeared faint orange while the background area appeared purple, thereby providing poor contrast and poor legibility of the retroreflective image. The poor contrast was believed to be the result of similar "sticking coefficient" properties of the adhesive which was used as lacquer and the spacing layer.

Similar results were observed during attempted heat tampering as were obtained in Example 6.

Similar abrasion resistance and point pressure resistance results were observed as in Example 1.

EXAMPLE 8

It is believed that a security laminate adapted to be applied to thermally-imageable dye receptor surface could be made by making a laminate as in Example 6 and applying, e.g., by notch bar coating, a layer of VITEL 222 polyester resin, available from Goodyear Company, having a 2 mil (50 microns) dry thickness over the attachment adhesive used in that Example.

Such a security laminate would provide the diffuse and retroreflective appearances described in Example 6 and could be heat laminated to a thermally-imageable surface while yielding high dye stability.

EXAMPLE 9

It is believed that a security laminate could be made as described in Example 6 except the cover sheet could comprise only two layers, an outer layer of a 1 mil (25 microns) thick film of SURLYN 9910 and a bonding layer of a 2 mil (50 microns) thick film of PRIMACOR 3460.

EXAMPLE 10

It is believed that a security laminate could be made with a cover sheet like that used in Example 6 upon which a layer of VITON A resin from Du Pont as binder material would be notch bar coated and partially dried, following which microspheres having a refractive index of about 2.58 would be cascaded to form a monolayer of partially embedded microspheres therein. The rear surfaces of the microspheres would be exposed, i.e., would protrude from the binder layer. An adhesive ink formulation like that used in Example 7 could be flexographically printed in imagewise fashion thereover and then a layer of zinc sulfide having a thickness of about one quarter of one wavelength vapor coated thereover to provide the reflector. An attachment adhesive like that used in Example 6 could then be laminated over the reflector.

The retroreflective performance of such a laminate would be expected to be higher than that of the previous examples wherein the security laminates comprise a spacing layer located between the rear surfaces of the microspheres and the reflector.

Various modifications and alterations of this invention will become apparent to those skilled in the art without departing from the scope and spirit of this invention.

What is claimed is:

1. A legend-containing, substantially transparent laminate which is retroreflective over substantially its entire surface area, said laminate having retroreflective legend areas and retroreflective background areas, which areas are substantially transparent and substantially indistinguishable under ordinary diffuse light viewing conditions, said legend areas and said background areas having visually distinguishable retroreflective properties whereby said legend areas are readily discernible from said background areas under retroreflective light viewing conditions, wherein said laminate comprises:
   (a) a base sheet comprising microspheres arranged in substantially a monolayer with partially-light-transmissive reflectors disposed behind the rear surfaces thereof, said microspheres being at least partially embedded in a transparent binder layer, said base sheet further comprising lacquer disposed behind the rear surfaces of some of said microspheres; and
   (b) a cover sheet bonded to the front side of said base sheet, said cover sheet comprising an outer layer having an abrasion-resistant outer surface and a support layer on the inner surface of said outer layer, said outer surface suffering an increase in percent haze of less than about 20 percent when subjected to 100 abrasion cycles in accordance with ASTM D-1044-85, said support layer being resistant to deformation under localized pressure and characterized in that it has a thickness of at least about 25 microns and has a Knoop Hardness of at least about 10.

2. The laminate of claim 1 wherein said cover sheet further comprises a bonding layer which bonds said cover sheet to said base sheet.

3. The laminate of claim 1 wherein said outer layer comprises an ionomeric copolymer.

4. The laminate of claim 1 wherein said support layer comprises a polyethylene terephthalate film.

5. The laminate of claim 1 wherein said support layer has a Knoop Hardness of at least about 20.

6. The laminate of claim 1 wherein said support layer has a Young's Modulus of between about 3500 and about 5500 MPa.

7. The laminate of claim 1 further comprising a lamination liner releasably bonded to said outer surface of said outer layer.

8. The laminate of claim 7 wherein said lamination liner is a polyethylene terephthalate film.

9. The laminate of claim 7 wherein said lamination liner is temperature resistant such that it shrinks or expands only about 3 percent or less when heated to between about 200° F. and about 350° F. and the inner surface thereof has a glossy finish.

10. The laminate of claim 1 wherein said legend areas are in the form of at least one of the following: a logo or an alphanumeric character.

11. The laminate of claim 1 wherein said legend areas retroreflect a different color distribution than the background areas.

12. The laminate of claim 11 wherein said legend areas appear yellow and the background areas appear purple-blue in retroreflective viewing with a substantially white light source.

13. The laminate of claim 1 wherein said legend areas and said background areas have different retroreflective efficiency.

14. The laminate of claim 1 further comprising an attachment adhesive on the back side of said base sheet.

15. The laminate of claim 14 wherein said attachment adhesive comprises first segments and second segments wherein said first segments adhere more strongly to said reflector than do said second segments.

16. The laminate of claim 14 further comprising a release liner covering said attachment adhesive.

17. The laminate of claim 14 further comprising a bonding layer which bonds said cover sheet to said base sheet, said bonding layer having a higher melt index than the melt index of said attachment adhesive.

18. The laminate of claim 14 wherein said attachment adhesive is adapted to compatibly bond with at least one of the following:
   a) photographic emulsions; or
   b) surfaces comprising dye receptor material selectively imaged by thermal dye sublimation.

19. The laminate of claim 1 wherein said microspheres have an average diameter of between about 40 and about 200 microns.

20. The laminate of claim 1 wherein said microspheres have a refractive index of between about 2.00 and about 2.60.

21. The laminate of claim 1 wherein said binder layer has a refractive index of between about 1.3 and about 1.5.

22. The laminate of claim 1 wherein said binder layer forms a spacing layer directly behind the rear surfaces of at least some of said microspheres.

23. The laminate of claim 1 wherein said lacquer is in direct contact with the rear surfaces of some of said microspheres.

24. A secured document comprising an information surface having information displayed on at least a portion thereof, said document further comprising a security laminate of claim 1 bonded thereto with an attachment adhesive such that said laminate covers at least a portion of said information.

25. The secured document of claim 24 further comprising a backing member.

26. The secured document of claim 25 wherein segments of said security film are over-extensive with said portion of said information surface, said segments being bonded to said backing member.

27. The secured document of claim 24 wherein said attachment adhesive is adapted to compatibly bond to at least one of the following:
   a) photographic emulsions; or
   b) surfaces comprising dye receptor material selectively imaged by thermal dye sublimation.

28. A laminate comprising an outer layer having an abrasion-resistant outer surface, a support layer on the inner surface of said outer layer, and an adhesive layer on the opposite side of said support layer as said outer layer,
   said outer surface suffering an increase in percent haze of less than about 20 percent when subjected to 100 abrasion cycles in accordance with ASTM D-1044-85,
   said support layer being resistant to deformation under localized pressure and characterized in that it has a thickness of at least about 25 microns and has a Knoop Hardness of at least about 10.

* * * * *

UNITED STATES PATENT AND TRADEMARK OFFICE
CERTIFICATE OF CORRECTION

PATENT NO. : 5,080,463
DATED : January 14, 1992
INVENTOR(S) : Lynn E. Faykish et al.

It is certified that error appears in the above-identified patent and that said Letters Patent is hereby corrected as shown below:

In Col. 2, Line 53, insert --b)-- before the first word "a".

In Col. 4, Lines 58-61, delete "moderate temperatures and environments, e.g., upon exposure to high humidity, and have a suitable refractive index which will enable the laminate to provide desired".

In Col. 10, Line 14, after the word "when" insert the word --heated--.

In Col. 11, Line 52, the word "spaling" should read --spacing--.

In Col. 11, Line 53, between the words "of" and "order", insert --selectively deposited lacquer 19. As is understood, in--.

In Col. 13, Line 56, before the last word "the", insert --slight marring of--.

Signed and Sealed this

Sixth Day of December, 1994

*Attest:*

BRUCE LEHMAN

*Attesting Officer*     *Commissioner of Patents and Trademarks*